United States Patent [19]  
Ziobrowski

[11] 3,772,047  
[45] Nov. 13, 1973

[54] PREPARATION OF RED SHADE MOLYBDATE ORANGE PIGMENTS

[75] Inventor: Bernard G. Ziobrowski, Glens Falls, N.Y.

[73] Assignee: Hercules Incorporated, Wilmington, Del.

[22] Filed: Apr. 5, 1972

[21] Appl. No.: 241,394

[52] U.S. Cl................... 106/297, 106/298, 106/302
[51] Int. Cl................................................. C09c 1/20
[58] Field of Search..................... 106/297, 298, 302

[56] References Cited
UNITED STATES PATENTS

| | | | |
|---|---|---|---|
| 3,370,971 | 2/1968 | Linton | 106/298 |
| 3,567,477 | 3/1971 | Higgins | 106/298 |
| 3,682,672 | 8/1972 | Mau et al. | 106/297 |

Primary Examiner—Curtis R. Davis  
Attorney—Hazel L. Deming et al.

[57] ABSTRACT

Clear, bright and very red shades of molybdate orange pigments are described. The pigments are produced by precipitating the molybdate orange pigment particles in the presence of a starter solution containing barium and zinc cations and an anion mixture comprising molybdate ions and at least one anion which is a chromate or sulfate ion.

5 Claims, No Drawings

PREPARATION OF RED SHADE MOLYBDATE ORANGE PIGMENTS

This invention relates to red shade molybdate orange pigments and more particularly to a process for producing clean, very red and bright hues of molybdate orange.

The molybdate orange pigments are solid solutions of lead chromate, lead molybdate and lead sulfate and range in color from light orange to red, maximum redness in the lead chromate-molybdate-sulfate system being achieved by varying specific processing conditions such as the temperature and the pH during the strike and the type of aging in order to increase the size of the particles. However, when molybdate orange pigments are produced under the optimum processing conditions for redness, the resulting red colors are dull and weak and thus have limited or no commercial value.

Various methods have been proposed to increase the strength and brightness of lead chromate-containing pigments. One such method which has been proposed involves conducting the chrome yellow reaction under substantially constant conditions. In order to do this, separate streams of the chromate solution and the lead salt solution are run into a mixing chamber in a predetermined volume relationship and the overflow is constantly removed. A controlled excess of at least about 4% of chromate ions is said to be essential throughout precipitation if good color strength, cleanness of color and good light stability are to be obtained. Molybdate orange pigments, however, cannot be produced in this manner.

It has also been proposed to replace up to 80% of the lead of molybdate orange pigments with barium or strontium. Pigments produced in this manner have improved fastness against weak alkalies. However, the improvement is at the expense of other desirable properties and such replacements diminish color strength.

Still another method which has been proposed relates to increasing the redness and covering power of molybdate orange pigments by precipitating mixed crystals of lead chromate, lead sulfate and lead molybdate from aqueous solutions of lead salts with a strongly acid precipitating solution. This method gives much redder and more vivid colors than are obtained in the absence of strong acid. However, the degree of redness of the color is difficult to control and the resulting red colors still lack the very bright red hue desired of red pigments. Replacement of part of the lead content of such pigments by barium and/or strontium has also been suggested to provide further improvement in the strength of the color. Such, however, is at the expense of redness, and yellower shades of red are obtained.

Now, in accordance with the present invention, it has been found that clear, brighter, far redder shades of molybdate orange pigments than were heretofore known can be produced if the molybdate orange pigment particles are precipitated in the presence of a starter solution comprising barium and zinc ions and an anion mixture comprising molybdate ion and at least one anion which is a chromate or sulfate anion. Accordingly, the present invention relates to a process for producing such pigments by (a) separately and simultaneously introducing essentially stoichiometric amounts of a lead salt solution and a chromate-molybdate-sulfate solution into an agitated starter solution comprising, per mole of lead salt introduced, 0.1 to 0.9 mole of barium ions, 0.1 to 1.0 mole of zinc ions and 0.04 to 0.8 mole of a mixture of anions comprising molybdate anions and at least one anion which is a chromate or sulfate anion, the ratio of the number of moles of barium ions to the number of moles of said anion mixture being greater than 1 and said chromate-molybdate-sulfate solution containing from 81 to 91 mole % of chromate ions, 5 to 14 mole % of molybdate ions and 2 to 5 mole % of sulfate ions, (b) precipitating a red shade molybdate orange pigment, and then (c) recovering the pigment, and to the pigment so produced.

In the practice of the invention a stream of the lead salt solution and a stream of the chromate-molybdate-sulfate solution are fed simultaneously at a predetermined rate, preferably through separate pipes, into a tank containing the agitated starter solution. The concentrations of the lead salt solution and the chromate-molybdate-sulfate solution can be varied over a considerable range. Generally, the concentrations will range from about 0.4 to about 1.5 moles per liter, and preferably from about 1 to about 1.4 moles per liter, although slightly lower or higher concentrations can be used. Lower concentrations are in general economically unattractive whereas higher concentrations usually make it difficult to obtain uniform precipitates. The concentration of the starter solution likewise can be varied over a wide range. The starter solution will, of course, contain the necessary cations and anions in water and preferably will be maintained sufficiently dilute to provide adequate fluidity for agitation without detriment to the economics of the process. Usually the starter solution will contain less than about 0.15 mole of salts per liter.

Considerable latitude is permissible in the conditions employed for precipitation. Usually, precipitation will be carried out by introducing the two streams into the starter solution at a pH below 7 and generally at a pH ranging from about 5 to about 1.6, and at a temperature ranging from about 0 to about 50° C. Preferably, the pH will be between about 2.5 and about 5.0, with the temperature in the range of about 0° C. to about 40° C. The total time for the reaction will also vary, but usually will range up to about an hour.

As stated, the starter solution contains, based on each mole of lead salt introduced, 0.1 to 0.9 mole of barium ions, 0.1 to 1.0 mole of zinc ions and 0.04 to 0.8 mole of a mixture of anions containing molybdate anions and at least one anion which is a chromate or sulfate anion. Additionally, the starter solution will contain a molar excess of barium ions, i.e., the ratio of the number of moles of barium ions to the number of moles molybdate, chromate and sulfate in the anion mixture being greater than 1. Preferably the ratio will range from about 1.05 to about 16. In addition, lead, cadmium, strontium and calcium cations can also be present in amounts up to a total of about 1 mole per mole of the lead salt introduced. Any lead cations present, however, should be less than 0.25 times the molar amount of barium cations present. Anions such as chloride, tungstate and nitrate anions in amounts up to about a total of 1 mole per mole of lead salt introduced can also be present. Particularly preferred is a starter solution containing, per mole of lead salt introduced, 0.2 to 0.4 mole of barium as barium chloride, 0.1 to 0.6 mole of zinc as zinc chloride, and 0.05 to 0.3 mole of a mixture of chromate, molybdate and sulfate ions.

The lead salt solution can be an aqueous solution of any water-soluble lead compound and is preferably an aqueous solution of lead nitrate or lead acetate. The chromate-molybdate-sulfate solution is likewise an aqueous solution of the appropriate water-soluble salts and is preferably a solution of sodium chromate, sodium molybdate and sodium sulfate, although the potassium lithium or ammonium salts are also useful. Preferred barium and zinc salts are the halides, such as the chlorides, or nitrates.

Following precipitation, the molybdate orange pigment particles are isolated conventionally, as by separating the product from the aqueous medium by filtration or decantation. The product can be used as such in the form of a water wet presscake or, if desired, can be washed, dried and milled in known manner. If desired, the precipitated pigment, in the aqeuous medium in which it is formed or as presscake, can be after-treated to improve its heat resistance, stability, light fastness, chemical resistance, strength, etc. Preferably, the pigment is after-treated by adding aluminum sulfate, titanium sulfate, sodium phosphate, sodium carbonate, sodium silicate or other known after-treatment materials, used by pigment chemists for these purposes, directly to the precipitate in the aqueous medium in which it is formed. Thus there can be applied directly to the pigment particles a coating of, for example, aluminum phosphate, aluminum titanium phosphate or aluminum silicate. Usually any coating applied as an after-treatment will be in an amount equal to about 0.5% to about 20% based on the weight of the pigment.

The invention is further illustrated by the following examples wherein all parts and percentages are by weight unless otherwise indicated.

EXAMPLE 1

Three solutions are prepared as follows:

Solutions A — a lead nitrate solution is prepared by dissolving 266 grams (0.8 mole) of lead nitrate in 600 grams of water at 35°–40° C.

Solution B — a chrome solution is prepared by dissolving 98 grams (0.33 mole) of sodium dichromate ($Na_2Cr_2O_7 \cdot 2H_2O$), 22 grams (0.11) mole of sodium molybdate, 3.1 grams (0.02 mole) of sodium sulfate, and 27 grams of sodium hydroxide in 600 grams of water at 35°–45° C.

Solution C — a starter solution is prepared by dissolving 78 grams (0.37 mole) of barium chloride in 5,000 grams of water at 25° C., adding to the solution with stirring 28.5 grams (0.14 mole) of sodium molybdate and 5.6 grams (0.04 mole) of sodium sulfate at 25° C. and then adding to the suspension so produced a solution of 18.3 grams (0.23 mole) of zinc oxide dissolved in 55 grams of 29.3% hydrochloric acid. The pH of the mixture is adjusted to about 3.0 to 4.0 with sodium hydroxide.

A pigment is struck by separately feeding at the rate of about 30 ml/min. solution A and solution B into a tank equipped with an agitator and containing solution C, agitation being carried out during the introduction. Next 0.6 mole of titanium sulfate, 1.4 mole of alum and 4.3 moles of phosphoric acid and then 1.5 moles of antimony oxide dissolved in hydrochloric acid are added to the mixture in the tank. The pigment is neutralized and then recovered by filtering the slurry, washing the filter cake free of soluble salts and then drying the washed cake at 93° C. for 12 hours. The product is a bright red pigment characterized by the typical x-ray diffraction pattern for molybdate orange pigments. The pattern, however, lacks the intensity, sharpness and resolution of the typical x-ray diffraction pattern, indicating a lower degree of order in the structure. The resulting pigment contains (exclusive of zinc and after-coating agents) 67 mole % of lead chromate, 10.8 mole % of lead molybdate, 2.1 mole % of lead sulfate, 11.5 mole % of barium molybdate and 8.9 mole % of barium sulfate.

A control pigment is also produced in the same manner of the example by repeating the above procedure except that in the preparation of the starter solution C, 123 grams (0.37 mole) of lead nitrate are substituted for the 78 grams of barium chloride. The control pigment is a dull, milky red product which is less bright and less red than the product of this example.

EXAMPLE 2

The procedure of Example 1 is repeated except that in the preparation of solution C, 9.5 grams (0.05 mole) of sodium molybdate is used and 11.8 grams (0.05 mole) of sodium bichromate is substituted for the 5.6 grams of sodium sulfate. The product of this example is a bright red clear pigment having a far redder, brighter hue than the control pigment prepared above. The pigment is a little less red and a little stronger than the pigment of example 1.

EXAMPLE 3

The procedure of example 1 is repeated except that solution C is prepared as follows: to a solution of 97.5 grams (0.47 mole) of barium chloride dissolved in 5,000 grams of water at 25° C., is added with stirring 29.5 grams (0.11 mole) of sodium bichromate, 9.5 grams (0.05 mole) of sodium molybdate and 5.6 grams (0.04 mole) of sodium sulfate at 25° C. and then a solution of 18.3 grams (0.23 mole) of zinc oxide dissolved in 55 grams of 29.3% hydrochloric acid. The product of this example is a bright red, clear pigment. It is a little redder and weaker and a little less bright than the pigment of example 1, and much redder and brighter than the control pigment.

EXAMPLE 4

The procedure of example 3 is repeated except that in the preparation of solution C, the amount of barium chloride is reduced to 78 grams (0.37 mole) and 5.9 grams (0.02 mole) of sodium bichromate are used instead of the 29.5 grams of sodium bichromate. A bright red pigment similar to the pigment of example 1 is obtained. It is a little less red but stronger and cleaner than the pigment of example 1. The pigment is also far redder and brighter than the control pigment.

EXAMPLE 5

The procedure of example 1 is repeated except that the starter solution C contains:

136 grams (0.65 mole) of barium chloride
41.3 grams (0.16 mole) of sodium bichromate
9.5 grams (0.05 mole) of sodium molybdate
5.6 grams (0.04 mole) of sodium sulfate, and 18.3 grams (0.23 mole) of zinc oxide. The bright red pigment is a little redder and a little less bright than the pigment of example 1.

EXAMPLE 6

The procedure of example 1 is repeated except that in the preparation of solution C 19 grams (0.09 mole) of sodium molybdate is used and 30 grams (0.22 mole) of zinc chloride is substituted for the 18.3 grams of zinc oxide. A bright red pigment having far redder hue and brightness than the control pigment is obtained. The pigment is a little cleaner and stronger than the pigment of example 1.

What I claim and desire to protect by Letters Patent is:

1. A process for producing clear, bright red shades of molybdate orange pigments comprising (a) separately and simultaneously introducing essentially stoichiometric amounts of a lead salt solution and a chromate-molybdate-sulfate solution into an agitated starter solution comprising, per mole of lead salt introduced, 0.1 to 0.9 mole of barium ions, 0.1 to 1.0 mole of zinc ions and 0.04 to 0.8 mole of a mixture of anions comprising molybdate anions and at least one anion which is a chromate or sulfate anion, the ratio of the number of moles of barium ions to the number of moles of said anion mixture being greater than 1 and said chromate-molybdate-sulfate solution containing from 81 to 91 mole % of chromate ions, from 5 to 14 mole % of molybdate ions and from 2 to 5 mole % of sulfate ions, (b) precipitating a red-shade molybdate orange pigment and then (c) recovering the pigment.

2. The process of claim 1 wherein the pH of the starter solution ranges from about 2.5 to about 5.0.

3. The process of claim 2 wherein the precipitated pigment, prior to recovery, is after-treated by coating the pigment particles with from about 0.5 to about 20% by weight of the pigment of a material selected from silica, alumina, titania, aluminum-titanium phosphate, aluminum silicate and antimony oxychloride.

4. The process of claim 3 wherein the starter solution comprises 0.2 to 0.4 mole of barium ions, 0.1 to 0.6 mole of zinc ions, and 0.05 to 0.3 mole of the anion mixture.

5. The clear, bright red shade of molybdate orange pigment prepared according to the process of claim 1.

* * * * *